3,222,191
NOVEL PACKAGING FILM AND PROCESSES
THEREFOR
Robert H. Steiner, Rochester, Theodore B. Simpson, Macedon, and John E. Hammond, Rochester, N.Y., assignors to National Distillers and Chemical Corporation, New York, N.Y., a corporation of Virginia
No Drawing. Filed Nov. 7, 1961, Ser. No. 151,417
7 Claims. (Cl. 99—174)

The present invention relates generally to improved thermoplastic sheeting and films, and specifically to new fogging-resistant polyolefin wrapping materials that are especially adapted to wrapping moisture-containing and moisture-emitting products such as fresh meats, poultry, fresh vegetables, and the like, and particularly for wrapping products that are subjected to refrigeration while so packaged. It is especially adapted for making such packaging materials from thermoplastic polymers of ethylene or of propylene, from copolymers thereof, and from copolymers of ethylene and of propylene with other polymerizable monomers.

It is an object of this invention to provide a method for making strong, anti-fogging packaging materials having improved optical properties, using thermoplastic polyolefin sheeting or film.

It is a further object of the invention to provide an improved transparent wrapping material for packaging moisture-containing food products in which the wrapping material is resistant to fogging which is caused by moisture condensing thereon when the wrapped products are subjected to temperature changes.

Another object is to provide a wrapping material for moisture-containing products for which a polyolefin sheet or film is the base material or substrate.

It is a further object of this invention to provide an improved strong, flexible wrapping material having good optical properties and relatively high permeability to oxygen and which is resistant to fogging when used to encase moisture-containing food products, normally subjected to refrigeration, by coating a polyolefin sheet or film.

Other objects and advantages of the invention will become apparent from the following description.

It has become wide-spread commercial practice in the merchandising of freshly cut meats and other produce to wrap individual items in films of transparent plastic material. The thus-wrapped products are visible through the packaging material and can be displayed, for example, in a refrigerated counter.

The characteristics of the wrapping material are very important for this type of application. The package should be attractive, and the inner surface of the plastic wrapping material must be resistant to fogging under conditions of refrigeration and during changes of temperature. Furthermore, the meat, poultry, or other product encased in such a package must remain fresh and retain its color during wrapping, display, and storage. For example, when used to encase freshly cut red meats, the package wrapping should transmit oxygen at a rate sufficient to retain the red color or so-called "bloom" of the meat. The film should also be capable of being readily and tightly sealed, preferably by heat, to substantially prevent leakage of moisture and juices contained in the completed package.

The wrapping film material should be relatively impervious to moisture in order to prevent loss of moisture from the encased product. The wrapping film also must remain flexible and tough and must not tear or crack during use or become brittle.

Since many polyolefin plastic films inherently possess certain desired properties, including good strength, low water permeability, and excellent low temperature sealability, transparent polyolefin film or sheeting offers a good material for use as a substrate or base for such packaging materials.

Because of other inherent properties of polyolefin film, however, principally the hydrophobic characteristics of the film surface, after moisture-containing products are encased therein, water of condensation rapidly collects and remains on the inner surface of the film as droplets which results in fogging of the film and serious impairment of the transparency. In this way the appearance of the wrapped material is greatly damaged. In particular, it has been noticed that such condensation occurs more noticeably when the wrapped moisture-containing products are subjected to temperature changes such as refrigeration after having been packaged. Subsequently, cycles of temperature changes will also produce the fogging effect in a more pronounced and erratic fashion.

It has now been found that a strong, anti-fogging polyolefin wrapping material having the above-described improved characteristics can be produced by extruding the polyolefin sheeting or film at high temperatures and under certain critical conditions by the procedure to be described hereinafter and then applying to the so-extruded sheeting or film a suitable anti-fogging composition on the inner side, that side to be exposed to the produce being wrapped.

Although the practice of this invention will be illustrated with use of a polyethylene film, the invention is not intended to be limited thereto. It is especially preferred in carrying out the invention to use as the polyolefin substrate or base as a polyethylene film or a polypropylene film. It is, however, also possible to employ as the base material copolymers of ethylene and propylene, either with each other or with at least one other polymerizable monomer, such as for example those alpha-olefins having from 2 to 8 carbon atoms, such as 1-butene, 1-pentene, 1-hexene, 1-heptene, 1-octene, and mixed higher alpha-olefins. Comonomers which can be broadly used include monosubstituted ethylenes such as 1-pentene, allyl benzene, $C_8$–$C_{14}$ mixed alpha-olefins, styrene, allyl naphthalene, and the like; 1,1-disubstituted ethylenes such as alpha-methyl styrene, 2-methylbutene-1, mixed alpha- and beta-pinenes, camphene, and the like; 1,2-disubstituted ethylenes such as indene, acenaphthylene, cyclopentene, norbornylene, cyclohexene, trans-stilbene, 2-pentene, and the like; acetylenes such as isopropenyl acetylene and phenyl acetylene; chloroolefins such as beta-methallyl chloride, chloromethyl norbornylene, and m-chlorostyrene; ethers; epoxides; esters such as vinyl butyrate, vinyl acetate, and methyl acrylate; and nitrogen compounds such as vinyl carbazole, 4-vinyl pyridine, and acrylonitrile. Blends of such polymers and copolymers can also be employed to make the substrate resins.

The polyolefin sheeting or film material that is selected to act as the base for the herein-disclosed coated packaging and wrapping material may be, for example, from about 0.25 up to about 5 mils in thickness, and the preferred film thickness is from about 0.5 to 1.5 mils. It is to be understood that films and sheeting materials of either lesser or greater thickness may also be employed in the practice of this invention, depending upon the end use intended for the coated product.

The physical properties of the substrate film employed should include high permeability, high strength, good handling characteristics, and good optical properties. Low-density polyethylene film has poor optical properties, e.g., it has a high degree of haze and low "see-through" characteristics. It has now been found that film extruded at high temperature has good optical properties and improved oxygen transmission. In order to get the desired characteristics, the polyolefin film is generally prepared from a low-density polyethylene resin, i.e., one having a density between about 0.905 and 0.923. The process of this invention, however, is not limited thereto, being applicable also to other resins of similar density properties as well as to resins of medium and high densities, whereby different properties may be enhanced.

In order to attain the desired optical and strength properties, the selected polyolefin resin should be extruded at high speed, high pressure, and high temperature, using as large an air gap (draw-down) distance through which the hot melt is drawn down from the die to the chill roll as is compatible with the operability of the process and the physical property requirements of the product. The speed of the extrusion is generally at least 100 feet per minute, and preferably is between about 100 to 600 feet per minute. The extruder pressure is generally in the range of about 1,000 to 10,000 pounds per square inch, and preferably about 2,000 to 4,000. The resin is extruded at a temperature of about 550° to 700° F., preferably at about 550° to 650° F. In addition, it is desired that the extruder be designed to provide the maximum shear on the melt, taking into consideration such extruder design factors as the depth of the roots of the flights of the extruder screw, the length of the metering zone on the screw, and the amount of shear in the extruder valve.

By drawing the film from the extruder at a high speed, i.e., at least 100 feet per minute, undesired "applesauce" (the textured appearance of the surface of a film) is avoided in the finished film to be used as substrate.

In order to achieve maximum permeability, it is important also that the film be quenched extremely rapidly. The hot resin melt should, therefore, be prevented from cooling until it hits the quench rolls. These rolls should be kept as cold as possible, and an air knife may be employed to force the film suddenly and rapidly against the chill roll. The hot melt may be shielded from premature cooling by any convenient means, such as by a shield or by blowing a small stream of heated air onto the hot melt.

By extruding the polyolefin resin under the conditions discussed above, a film having the desired properties of high permeability, high strength, good handleability, and good optical properties has been produced.

Extrusion under the above-described conditions also results in a somewhat crosslinked film, thus providing resistance to melt-through when the film is heat-sealed, reducing the brittle point of the film, and improving its toughness and solvent resistance. In addition, this process tends to produce a film having the ability to shrink when exposed to heat, thus providing a film that is particularly attractive for packaging operations. Shrinkability of the film may be enhanced by having as large as possible the air-gap through which the hot melt is drawn down to the chill roll, the allowable residence time for the film in this air-gap ranging from 0.01 to 0.001 minute, the optimum time being 0.006 minute.

In one embodiment, the anti-fogging composition with which the film is coated is made up of a selected water-soluble polymer together with a selected solid, water-soluble inorganic material, such as an inorganic salt.

Although other materials may be added to the above-defined coating composition in order to realize special advantages, it has been found essential in this embodiment to include at least one representative of each of the above two classes of components in the coating composition used in accordance with the invention, although in some cases certain water-soluble polymers can be used without other components to achieve satisfactory results.

The basic and most essential component of this coating composition is a water-soluble, highly-substituted cellulose ether, having for example at least one and preferably two or more ether linkages per anhydroglucose unit and at least one free hydroxyl group per anhydroglucose unit. The substituting groups may be methyl, ethyl, propyl, hydroxypropyl, or any combinations of these. It is essential that the cellulose ether employed be substantially water-soluble under the conditions of use, thus limiting to some extent the size of the substituting groups that may be present. For instance, any substitution of solubilizing groups on the substituting group itself is desirable, such as hydroxyethyl and hydroxypropyl groups, carboxymethyl groups, and the like.

As another highly desirable component of this coating composition there should be present limited and controlled amounts of a water-soluble inorganic salt in order to increase the speed of the anti-fog action. It has been found that the inorganic material is needed to clear the fog quickly after it has formed on the film; possibly to prevent the initial formation of the fog; and also to aid in prolonging the anti-fog properties of the film. Typical water-soluble inorganic compounds that have been found to operate satisfactorily include sodium chloride, sodium carbonate, sodium bicarbonate, sodium silicate, sodium ortho and pyro phosphates, sodium nitrate, sodium nitrite, and sodium sulfate. Corresponding salts of potassium and other alkali metals, including ammonium salts, may also be used with good results. In general, however, sodium salts are preferred for food packaging. Any water-soluble salt may be used, if desired, provided that its presence in effective amounts does not interfere with the solubility of the cellulose ether component.

While the ratio of the components present in this aqueous coating composition is not critical, it has been discovered that a weight ratio of from 1 part of salt to 1 part of cellulose ether up to about 8 to 1 is quite adequate.

In another embodiment the anti-fogging coating composition is a three-component one. Here the basic and most essential component is a water-soluble surface active or wetting agent. For food products this wetting agent is preferably anionic, although a mixture of nonionic material plus a portion of anionic material may be used satisfactorily. Nonionic agents alone may be used, but when the wetting agent is solely nonionic, the film being coated may require additional treatment in order to get good application and/or adherence of the coating to the film surface.

Anionic types of surface active agents include alkali metal salts of compounds containing hydrophilic groups, such as sulfonated paraffinic hydrocarbons, sulfonated aromatic hydrocarbons, sulfonated alkyl hydrocarbons, sulfonated natural fatty materials, sulfonated fatty alcohols, sulfonated fatty acid esters, fatty acid amides, amino acids; alkali metal salts of sulfuric acid esters of fatty alcohols; alkali metal salts of phosphoric acid esters of fatty alcohols; and alkali metal salts of products obtained by the saponification of fats. Examples of suitable anionic agents include sodium oleate, sodium stearate, potassium oleate, potassium lauryl sulfate, and many other compounds, such as for example the commercial products Nacconol NRSF (Allied Chemical Corp.'s sodium dodecylbenzene sulfonate), Igepon T–77 (General Aniline & Film Corp., Antara Chem. Div.'s sodium N-methyl-N-oleoyl taurate), Sipon (American Alcolac Corp.'s sodium lauryl sulfate), Maypon 4–C (Maywood Chemical Works' protein condensation product with oleoyl chloride), Aquarex D (Du Pont's sodium alkyl sulfate), Aresklene (Monsanto's dibutyl phenylphenol sodium disulfonate), Avitex AD (Du Pont's fatty alcohol sulfate), Duponol (Du Pont's fatty alcohol sulfates), Tergitol (Union Carbide Corp.'s sodium salt of alkyl sulfate), Sarkosyl (Geigy Chemical Corp.'s N-acyl sarcosines), Sarkosyl NL–97 (Geigy Chemical Corp.'s sodium N-lauroyl sarcosinate), and the like, and mixtures thereof.

Nonionic types of wetting agents may be condensation products of fatty materials and their derivatives with ethylene oxide, condensation products of phenolic compounds having side chains with ethylene oxide, and condensation products of sorbitan and sorbitan esters with ethylene oxide. Suitable nonionic agents include polyethylene glycol fatty acid esters, such as the distearates; Tweens (Atlas Powder Co.'s polyoxyalkylane sorbitan fatty acid esters); and Spans (Atlas Powder Co.'s long-chain fatty acid partial esters of hexitol anhydrides).

In addition to the wetting agent at least one second component should be included in this coating composition. This component is a water-soluble film-forming polymeric material, such as water-soluble resins, synthetic or natural gums, casein, pectins, algins, glues, gelatin, water-soluble starch derivatives, polyoxyethylenes, polyacrylic acids, and the like, or mixtures of these. Specific examples include carboxymethyl cellulose, carboxyethyl cellulose, hydroxymethyl cellulose, methylhydroxypropyl cellulose, polyvinyl pyrrolidone and its copolymers, propylene glycol alginate, polyvinyl alcohol, polyoxyethylene, and polycarboxymethylene. Such a film-forming material acts as a binder for the wetting agent and maintains it in the form of a thin coating that has sufficient adhesion to withstand normal handling. It also gives viscosity to the coating when re-wet and prolongs the anti-fog property of the wetting agent.

As the third component of this anti-fogging coating composition there should be present limited amounts, controlled to at least 10 percent of active wetting agent, of a water-soluble inorganic salt in order to increase the speed of the anti-fog action by facilitating rapid solution of the wetting agent in the water of condensation that collects on the film. As previously discussed, the inorganic material is needed to clear the fog quickly after it has formed on the film; possibly to prevent the initial formation of fog; and also to aid in prolonging the anti-fog properties of the film. Typical water-soluble inorganic compounds that have been found to operate satisfactorily when used in conjunction with the wetting agents include sodium chloride, sodium carbonate, sodium bicarbonate, sodium silicate, sodium ortho and pyro phosphates, sodium nitrate, sodium nitrite, and sodium sulfate. Corresponding salts of potassium and other alkali metals, including ammonium salts, may also be used with good results. In general, however, sodium salts are preferred for food packaging. Any water-soluble salt may be used, if desired, provided that its presence in effective amounts does not interfere with the solubility of the wetting agent component. For example, 2.0 parts by weight of tetrasodium pyrophosphate per 1.5 parts by weight of wetting agent is effective.

While the ratio of the components present in this aqueous coating composition is not critical, it has been discovered that a weight ratio of about 0.25 to 1.0 part by weight of water-soluble film-forming polymeric material to from about 1 to 8 parts of inorganic salt to 1 part of wetting agent is quite adequate. In some cases, where the film-forming material gives low viscosity solutions, up to 10 percent of the material may be used in the coating composition.

It is to be understood that these are only two embodiments of the anti-fogging coating composition and that the process of this invention is equally applicable to any other suitable anti-fogging material and systems having one or more components.

Thus, the anti-fogging coating to be put onto the film and said coating containing the ingredients above-described is desirably water-soluble. The coating thickness on the film may be in the approximate range of about 0.02 micron and 0.4 micron, and preferably between about 0.05 and 0.1 micron. The actual amount of coating used on the film is about 0.0001 gram per square inch. In application of the coating onto the film, the amount may vary from about 0.00002 gram per square inch to about 0.0005 gram per square inch, although the amount of each material required for producing maximum anti-fog properties while retaining transparency of the base film varies, depending upon the exact base film and upon the coating components selected.

It has been found that when the surface of the polyolefin film is coated with various substances the heat sealability of the resin is adversely affected, depending particularly upon the composition and upon the quantity of the coating. In order to insure that the polyolefin base film be tightly sealed when wrapped around an article, the film is desirably coated with anti-fogging composition on only one side, that is, only on the side that will be applied against the article being wrapped. The outer surface of the polyolefin film is left uncoated so that, when the article is wrapped in the film, the outer surface of the wrapping film may be fused and sealed to adjacent uncoated film surfaces. Thus, although the anti-fogging coating may, if desired, be applied to both sides of the polyolefin film, in practice, to produce a commercially satisfactory wrapping film, it is preferred to coat only the side of the film that is in contact with the moisture-containing products in order to realize the anti-fogging characteristics and other outstanding advantages of the invention.

To achieve the best results, the coating of the base film by the coating composition is done from an aqueous solution or dispersion containing the cellulose ether and the inorganic salts. The ether gum is slurried in a concentrated solution of the salt until the gum particles are well wetted-out, and the mixture is then diluted to the desired concentration. Other agents, as desired and as hereinafter disclosed, may be added subsequently or simultaneously to the mixture. For all items of food packaging it is imperative that the components contained in the coating composition be non-toxic and substantially odorless.

The dispersion or solution, preferably in aqueous form, is applied to the polyolefin structure or surface in any convenient and known manner, such as dipping, spraying, brushing, roll coating, gravure coating, and the like, preferably at a temperature of about 60° to 120° F. The excess aqueous coating solution may be removed by squeeze rolls, doctor knives, or the like. The coating composition should be applied in such an amount that there will be deposited upon drying a smooth, evenly distributed layer about 0.00002 to about 0.0005 gram per square inch, about 0.0001 gram per square inch being preferred. The thickness of the applied coating should be capable of dispersing moisture condensed thereon into a thin, relatively transparent film, spread evenly over the surface of the coated polyolefin film.

The coating on the polyolefin base is subsequently dried by hot air, radiant heat, or other convenient means. Upon drying, there is obtained a coated polyolefin film that has good permeability, high strength, good handling characteristics, good optical properties; that is resistant to fogging by droplets of moisture condensed thereon; and that is adapted for use, for instance, as a wrapping material or film for moisture-containing food products.

Further embodiments of this invention include the coating of the second side of the polyolefin substrate, that is, the side that does not have the anti-fogging coating, with various other coatings, as desired.

For example, the surfaces of highly quenched low density polyolefin film generally are relatively sticky, the side facing the chill roll being moderately less sticky than the opposite side. Depending on the exact product desired, either side of the film so produced can be coated with an anti-fogging coating. The uncoated side may remain somewhat tacky, and the coated film, therefore, may tend to adhere to itself when two or more surfaces of the film are pressed firmly together, such as for example when sheets of the film are stacked as in storage. Well-known anti-block agents may be used to reduce this tendency, if so desired.

Thus the above-described process, relating to the coating of a polyolefin film prepared by extrusion under severe conditions with an anti-fogging composition, provides a clear, strong, permeable film exceptionally useful as a wrap for fresh meat.

Other products contemplated as being especially suited and well-adapted for packaging and for the packaging of which the sheeting and film material of this invention is particularly suited include moisture-containing and moisture-emitting products such as poultry, food produce such as fresh fruits and vegetables, bakery products, dairy products, fish, sea foods, fresh flowers, and the like.

It is contemplated in the broad aspects of this invention that the polyolefin structures are novel. It is also contemplated that the coated polyolefin structures are themselves novel, as well as the sealed packages, structures, and containers formed therefrom, either with or without the encasement of products therein.

While there are disclosed below but a limited number of embodiments of the invention herein presented, it is possible to produce still other embodiments without departing from the inventive concept herein disclosed, and it is desired therefore that only such limitations be imposed on the appended claims as are stated therein.

EXAMPLE I

Part A

One hundred parts of a polyethylene resin having a density of 0.917 and a melt index of 1.1 was homogenized on a Banbury mixer and extruded under the following conditions:

| | |
|---|---|
| Extrusion temperature, ° F. | 650 |
| Extrusion pressure, p.s.i. | 3000 |
| Draw-down, inches | 11 |
| Line speed, feet per minute | 150 |
| Quench roll temperature, ° F. | 40 |

The resulting polyethylene film was 1.0 mil thick, had a melt index of 0.2, a haze value of 1.5 percent, and a gloss value of 84 percent.

Part B

One part of the methyl hydroxypropyl ether of cellulose, having a methoxy content of 28–30 percent, a hydroxypropoxyl content of 7–12 percent, and a viscosity of 4,000 centipoises, was slurried in six parts of a 20 percent by weight aqueous solution of sodium silicate and then diluted with water to 0.5 percent by weight of the cellulose ether.

The resulting 100 percent water-soluble coating composition (about 0.0001 gram per square inch) was applied to one side of the polyethylene film produced in Part A of this example by a gravure coating method; the coating was then dried by radiant heat.

Part C

The coated film produced in Part B hereof was used to encase fresh red meat by heat sealing of the meat inside the package, using a specially protected hand iron to effect the seals. The coated side of the film was in contact with the meat. The package was clear, transparent, strong, and without fog when placed under refrigeration at about 28° to 40° F. and remained free from fog during storage in such temperatures for up to 72 hours. When subjected to repeated cycles of cold storage followed by exposure to room temperature, no fog formed on the inner surfaces of the package.

EXAMPLE II

The procedure of Example I was repeated, except that the film was coated on one side with 0.00001 gram per square inch of an aqueous composition containing 0.5 percent by weight of methyl cellulose and 5 percent by weight of sodium pyrophosphate. The coated film was used to encase red meat as in Example I. No fog was visible at the end of 15 minutes, 4 hours, and 48 hours of continuous refrigeration.

EXAMPLE III

A water-soluble coating mixture containing 0.25 part of sodium carboxymethyl cellulose, 1.5 parts of sodium dodecylbenzene sulfonate, and 4.0 parts of tetrasodium pyrophosphate was prepared by dissolving the sulfonate and phosphate in 94.25 parts of demineralized water and then dissolving the sodium carboxymethyl cellulose in the solution with moderate agitation.

About 0.002 gram per square inch of the resulting aqueous coating composition (yielding about 0.0001 gram per square inch of dried solids) was used to coat one side of a polyethylene film prepared as in Part A of Example I by a gravure coating method; the coating was dried by radiant heat. The coated film was used to encase fresh red meat by heat sealing the meat inside of the package, using a specially protected hand iron to effect the film seals. The coated side of the film was in contact with or adjacent to the meat. The packaging film was clear, transparent, strong, and without fog when placed under refrigeration at about 28° to 40° F. and remained free from fog during storage in such temperatures for up to 72 hours. Also, when the package was subjected to repeated cycles of cold storage followed by exposure to room temperature, no fog formed on the inner surfaces of the package.

EXAMPLE IV

The procedure of Example I was repeated, except that the water-soluble coating mixture contained 0.25 part of sodium carboxymethyl cellulose, 1.5 parts of sodium dodecylbenzene sulfonate, 2.0 parts of tetrasodium pyrophosphate, and 4.0 parts of aqueous colloidal silica, prepared by dissolving the sulfonate and phosphate in 92.25 parts of demineralized water, then dissolving the sodium carboxymethyl cellulose in the solution with moderate agitation and adding the colloidal silica to the solution. Comparable results were obtained.

To demonstrate the advantages of extruding the film under the preferred operating conditions embodied herein, several comparative runs were made, as set forth in the following examples.

EXAMPLE V

The extrusion temperature may be between about 550° and 700° F., and the preferred temperature is between about 550° and 650° F. To demonstrate, Runs A and B were made at 500° and 750° F., respectively, and the results of these runs compared with the results of Runs C and D, made at 620° and 650° F., respectively.

TABLE I

| Run No. | Extrusion Temperature, ° F. | Film Optical Properties | |
|---|---|---|---|
| | | Haze, Percent | Gloss, Percent |
| A | 500 | 30 | 20 |
| B | 750 | 1.5 | 85 |
| C | 620 | 5.2 | 60 |
| D | 650 | 1.5 | 84 |

The resin film from Run A extruded at 500° F. as shown in Table I has optical disadvantages including high haze and low percentage gloss. Although at 750° F. temperature of extrusion these optical properties are good, the extrusion process itself becomes inoperable because of inherent viscosity properties of the resin at these temperatures.

EXAMPLE VI

The use of extruder screw cooling water has been found to harm the optical properties of the film, as shown below:

TABLE II

| Run No. | Screw Coolant | Film Optical Properties | |
| --- | --- | --- | --- |
| | | Haze, Percent | Gloss, Percent |
| E | Yes | 6.0 | 45 |
| F | No | 2.5 | 65 |

EXAMPLE VII

The air-gap (draw-down) distance, usually measured in inches, through which the hot resin melt is drawn from the die during extrusion should be as large as possible, as demonstrated below in Table III, the extrusion rate being about 180 feet per minute.

TABLE III

| Run No. | Draw-Down, Inches | Film Optical Properties | |
| --- | --- | --- | --- |
| | | Haze, Percent | Gloss, Percent |
| G | 9 | 5.2 | 60 |
| H | 13 | 3.0 | 66 |

It is to be understood that the residence time during draw-down in order to obtain the optimum see-through of the film is related to both draw-down and extrusion speed. Taking this into account, this time should be of a minimum of 0.001 minute to give satisfactory results. Further, the extrusion speed selected will in most cases be controlling, with the draw-down distance being selected as the result of its selection.

EXAMPLE VIII

To avoid the textured appearance of the surface of the film known as "applesauce" and measured by the "see-through" test, the film should be drawn from the extruder at a high speed, as demonstrated by Runs I and J:

TABLE IV

| Run No. | Line Speed, feet per minute | See-Through, feet |
| --- | --- | --- |
| I | 100 | 3 |
| J | 200 | 12 |

"See-through," referred to above, is expressed in feet and is measured as follows: A paper grid of 1/4" to 1/2" squares is mounted on a vertical surface. The tester looks at the grid through a sample of the film being tested and determines the maximum distance at which he can see the entire grid.

While this invention has been disclosed and illustrated by the above examples, it will be understood that the invention is obviously subject to other modifications and variations without departing from its broader aspects.

What is claimed is:

1. A polyolefin film having an anti-fogging coating on one surface thereof, said anti-fogging coating being selected from the group consisting of (1) at least one water-soluble cellulose ether and a water-soluble inorganic salt and (2) at least one wetting agent, at least one water-soluble film-forming agent, and at least one water-soluble inorganic salt, said film having been prepared by extruding at relatively high speeds a polyolefin resin of not more than 0.923 density at a temperature between about 550° and 700° F., a pressure between about 1,000 and 10,000 pounds per square inch, and a speed of at least 100 feet per minute, and said coating being capable of dispersing moisture condensed thereon in the form of a thin, transparent film, thereby preventing the fogging of said film upon exposure to changes in temperature.

2. A strong, transparent polyolefin wrapping film having an anti-fogging coating on one surface thereof, said anti-fogging coating being selected from the group consisting of (1) at least one water-soluble cellulose ether and a water-soluble inorganic salt and (2) at least one wetting agent, at least one water-soluble film-forming agent, and at least one water-soluble inorganic salt, said film having been prepared by extruding a polyethylene resin of not more than 0.923 density at a temperature between about 550° F. and 700° F., a pressure between about 1,000 and 10,000 pounds per square inch, and a speed above about 100 feet per minute.

3. A wrapping film as described in claim 2 wherein said film is extruded in a process employing a residence time between the extruder and the chill roll of not less than 0.001 minute.

4. As an article of manufacture, freshly cut red meat encased in a strong, transparent polyolefin film, the inner surface of which is coated with an anti-fogging composition selected from the group consisting of (1) at least one water-soluble cellulose ether and a water-soluble inorganic salt and (2) at least one wetting agent, at least one water-soluble film-forming agent, and at least one water-soluble inorganic salt, said substrate film having been prepared by extruding a polyolefin resin at a temperature between about 550° and 700° F., a pressure between about 1,000 and 10,000 pounds per square inch, and a speed of at least 100 feet per minute.

5. Moisture-emitting produce encased in a strong, transparent coated polyolefinic wrapping material, said wrapping material comprising a polyolefin substrate having on the inner surface thereof an anti-fogging composition selected from the group consisting of (1) at least one water-soluble cellulose ether and a water-soluble inorganic salt and (2) at least one wetting agent, at least one water-soluble film-forming agent, and at least one water-soluble inorganic salt, said polyolefin substrate having been prepared by extruding a polyolefin resin at a temperature between about 550° and 700° F., a pressure between about 1,000 and 10,000 pounds per square inch, and a speed of at least 100 feet per minute.

6. A package containing a moisture-emitting material encased in a clear, strong polyolefin film having an anti-fogging composition on the inner surface thereof, said anti-fogging composition being selected from the group consisting of (1) at least one water-soluble cellulose ether and a water-soluble inorganic salt and (2) at least one wetting agent, at least one water-soluble film-forming agent, and at least one water-soluble inorganic salt, said film having been prepared by extruding a polyolefin resin at a temperature between about 550° and 700° F., a pressure between about 1,000 and 10,000 pounds per square inch, and a speed of between 100 and 1,000 feet per minute.

7. A package according to that of claim 6 in which the material encased is freshly cut red meat; the polyolefin film is polyethylene having a density between about 0.905 and 0.923 extruded at 550° to 650° F., a pressure of about 2,000 to 4,000 pounds per square inch, and a speed of about 100 to 600 feet per minute; and the anti-fogging composition comprises a water-soluble cellulose ether and a water-soluble inorganic salt.

(References on following page)

References Cited by the Examiner

UNITED STATES PATENTS

| | | |
|---|---|---|
| 2,561,010 | 7/1951 | Carson. |
| 2,772,172 | 11/1956 | Carson _____ 99—174 |
| 2,979,410 | 4/1961 | Parlour _____ 99—171 |
| 3,048,263 | 8/1962 | Sacks et al. _____ 106—13 |
| 3,048,266 | 8/1962 | Hackhel et al. _____ 106—13 |
| 3,076,720 | 2/1963 | Rice et al. _____ 117—46 X |
| 3,099,350 | 7/1963 | Hammond _____ 99—194 X |

FOREIGN PATENTS

| | | |
|---|---|---|
| 553,802 | 1/1957 | Great Britain. |
| 880,059 | 10/1961 | Great Britain. |

A. LOUIS MONACELL, *Primary Examiner.*

ABRAHAM H. WINKELSTEIN, *Examiner.*